United States Patent [19]

Bowden

[11] 4,349,950

[45] Sep. 21, 1982

[54] HEAT EXCHANGER AND METHOD OF MAKING

[75] Inventor: Donald R. Bowden, Huntsville, Ala.

[73] Assignee: Solar Unlimited, Inc., Huntsville, Ala.

[21] Appl. No.: 248,111

[22] Filed: Mar. 27, 1981

Related U.S. Application Data

[62] Division of Ser. No. 55,128, Jul. 5, 1979, Pat. No. 4,321,963.

[51] Int. Cl.$^3$ .............................................. B23P 15/26
[52] U.S. Cl. ............................. 29/157.3 AH; 165/70; 165/163
[58] Field of Search ............... 29/157.3 AH; 165/163, 165/70

[56] References Cited

U.S. PATENT DOCUMENTS

| | | | |
|---|---|---|---|
| 877,252 | 1/1908 | Stolp | 29/157.3 AH |
| 1,852,490 | 4/1932 | Sullivan | 165/163 |
| 3,754,381 | 8/1973 | Cappiello et al. | 165/163 |
| 4,317,268 | 3/1982 | Bowden et al. | 29/157.3 AH |

*Primary Examiner*—Francis S. Husar
*Assistant Examiner*—V. K. Rising
*Attorney, Agent, or Firm*—Dowell & Dowell

[57] ABSTRACT

A heat exchanger having an outer shell member and having a helically wound volute member which is double walled and includes a finned outer tube and a close-fitting inner tube, and the heat exchanger further including a core member which extends through the helical volute member and closes its central aperture to confine the flow of liquid in the outer shell member to flow through the fins, rather than pass through the aperture through the center of the helical volute member. The fins on the double walled volute member are wound as close to touching the core member as possible and the diameter of the core member and of the outer shell member is such that the fins closely fit the space between them. Both the finned tube and the inner tube pass completely through the shell member, and the finned outer tube is soldered to the shell so that any leakage between the tubes will pass outside the heat exchanger shell member rather than mixing the heat exchanger liquids. Since the volute member cannot in practice by closely fitted both to the outer shell member and to the core member due to manufacturing tolerances, a process is provided by which two helical wires are wound, one against the core member and one against the shell member, and both helical wires have the same pitch as the volute member and are maintained in close proximity respectively to the core member and to the shell member, and are longitudinally spaced approximately midway between convolutions of the volute member.

2 Claims, 5 Drawing Figures

HEAT EXCHANGER AND METHOD OF MAKING

This is a division of application Ser. No. 055,128, filed July 5, 1979, now U.S. Pat. No. 4,321,963, issued Mar. 30, 1982.

FIELD OF INVENTION

This invention relates to improvements in heat exchangers and methods of making heat exchangers for transferring heat between a first relatively more viscose liquid flowing through the shell member of the exchanger and a second relatively less viscose liquid flowing through a helically wound finned tube member passing through the shell member in close engagement therewith and having a core member closing the central aperture of the helix, and more particularly relates to improvements in the form of helical wires designed to cause the more viscose liquid to pass between the fins of the tube instead of passing between the peripheries of the fins and the surfaces of the shell and the core members which the fins approach.

BACKGROUND AND PRIOR ART

The concept of directing the passage of liquid through a heater exchanger by making its path spiral instead of linear is shown in U.S. Pat. No. 3,020,026 to Peeps et al, in U.S. Pat. No. 3,446,032 to Bottum and in U.S. Pat. No. 3,545,063 to Mitchell, all of which show straight tube exchangers together with helical deflectors, instead of helical volute tube exchangers where the volute member snugly fits both a core member and a surrounding shell member and includes finned peripheries.

The establishment of spiral paths is often accomplished by helical wire members as shown in the preceding patents, but may be done by helical surface concentric tubes such as in U.S. Pat. No. 4,086,958 to Habdas wherein a helical finned inner tube lies within a helically grooved outer tube, although the pitches of the two members are very different, and the outer member provides a large cross section helical flow path which is entirely unoccupied by fins and unobstructed. Other examples of multiple different pitch helical members are shown in U.S. Pat. Nos. 556,630 to Hoberecht; 1,893,484 to Belt and 3,335,790 to Aranyi et al.

U.S. Pat. No. 2,146,141 to Harris shows a helical volute, which is in a straight walled outer shell and recessed in the helical groove of a core member. However, this structure does not include fins on the volute, and if fins were added, the function of the helical groove would be lost, since the fins would tend to stop all flow in each groove.

THE INVENTION

The present invention teaches an improved structure for a heat exchanger and an improved method for manufacturing the structure. The structure comprises a heat exchanger having an elongated shell member which is cylindrical in cross-section and has two axially spaced closed end portions through which two end tubes extend from a helical volute inside the shell and pass outwardly from the shell member. A first more viscose liquid, such as silicone oil, is pumped through the shell member, and a second less viscose liquid such as water passes through the helical volute member that extends through the center of the shell member. The helical volute member has a mandrel-like core member around which it is closely wound to prevent the flow of the first liquid through the central aperture of the helical volute member. The helical volute member itself comprises two coaxial tubes which are telescoped together, the outer tube being finned within the heat exchanger shell member and the inner tube being a snug fit in the outer tube and carrying the second liquid. Both coaxial tubes extend completely through the shell member, and the outer tube is soldered to the shell member externally thereof and then ends shortly beyond the soldered joint to provide a drip discharge for any liquids which might pass through the outer tube into the space between tubes, or which might pass from the inner tube outwardly into such space. The coaxial tubes are helically wound around the core member and the diameters of the shell member, the core member, and the fins of the volute member are such as to place the fins in close proximity to both the shell surface and the core surface. Successive convolutions of the helically wound volute member have their fins substantially touching each other, whereby the helical volute member has a predetermined pitch. A maximum number of convolutions are provided within the shell member, and the ends of the coaxial tubes then straighten out as they approach the inner ends of the shell member and pass therethrough. However, as a practical matter it is very difficult to wind a finned helical volute member to close enough tolerances that the outer fin edges of the volute member just touch the inner surface of the shell member, and at the same time the inner fin edges of the volute member just touch the surface of the core member. As a result, clearances exist between the fins and these surfaces through which the liquid in the shell seeks to directly pass, thereby reducing the efficiency of heat exchange. The invention seeks to obstruct these clearances and force the liquid to pass toward and between the fins. Therefore, according to the present invention the core member is provided with a helical wire which is wrapped around the core member with the same pitch as the convolutions of the volute member and is fixed to the core member so as to hold its position. Another helical wire is wound adjacent the inner surface of the shell member with the same pitch as the volute member, and after assembly of the parts this wire is maintained in tight contact with the inner surface of the shell by its own springiness. The convolutions of both wires are longitudinally spaced substantially centrally between the successive convolutions of the volute member.

The structure is manufactured by inserting the inner volute tube within the finned outer volute tube and winding it around the mandrel of a lathe to produce the correct number of volute turns, with the fins of adjacent convolutions in mutual contact. The inner helical wire is wound onto the outer surface of a cylindrical core member and is secured in place thereon, preferably by soldering. The core member can then be screwed through the central aperture of the volute member until it is centered with respect to its convolutions, whereby the inner wire member becomes substantially centered between adjacent convolutions of the finned volute. The outer shell then has one end spun closed and shaped to receive the outer tube where it exits from the volute member. Then a second helical wire is wound on a lathe with the same pitch as the volute member and slightly greater outer diameter. It is then threaded onto the volute member and one end of the outer helical wire is tacked by soldering to the first convolution of the volute member. The wire is then distorted by twisting so that it tightens its convolutions so that they are reduced in diameter and lie between adjacent turns of the volute member. Then the other end of the outer helical wire is tacked by soldering to the last convolution of the volute member while still twisted, whereby the outer wire helix has its turns pulled somewhat inside of the outermost diameter of the finned volute member. With both ends of the wire thus soldered to temporarily hold the outer wire in this position, the volute member is then slid into the outer shell member. The end of the outer wire helix is then clipped at one end where it was soldered to the volute member, so that the wire expands outwardly against the inner surface of the shell. The second end of the shell member is then spun downwardly against the outer tube of the volute member which has been stripped of fins where it approaches the end of the shell, and the shell is then soldered to the outer tube leaving a short length of the outer tube extending beyond the end of the shell member. As a result, the volute member now has inner and outer helical wires which act as spoilers to prevent laminar flow straight through the heat exchanger adjacent to the surfaces of the shell member and of the core member, whereby the flow of first viscose fluid is deflected away from surface clearances and into the fins, rather than being permitted to partially avoid flowing through the fins, these wires being approximately normal to the planes of the fins and being much smaller in diameter than the diameter of a fin so as to leave most of the space between fins open to receive liquid flowing essentially axially of the shell member.

OBJECTS AND ADVANTAGES OF THE INVENTION

In recent years the government has been requiring that wherever a heat exchanger conducts the domestic water supply of a building through some other fluid in heat exchange relation therewith, the tube conducting the domestic water supply must be double-walled, and the space between the double walls must be vented outside of the heat exchange unit so that any leakage will show up as drippage from between the double-walled tubes. Although there are a lot of patents showing double-walled tube heat exchangers, the tubes of most patented double-walled units are straight rather than helical, and for several reasons this type of straight tubed heat exchanger is inefficient when it comes to transferring heat to the liquid inside the double-walled tube from a surrounding liquid outside thereof. One reason for such inefficiency is that the double-walled tube creates a small air space between the inner and outer tubes, the tubes touching only occasionally and will small areas of contact. The intervening thin layer of air introduces a high degree of insulation between the tubes which is extremely undesirable. In order to greatly increase the area of contact between the inner and outer tubes, the applicant winds the coaxial tubes into a helix, whereby since the tubes distort into an oval cross-section as they are bent into the volute form, the inner and outer tubes are tightly pressed together over large areas of their peripheral surfaces with the result that the heat exchange between tubes is greatly increased. In addition, the applicant houses the double-walled volute tubes within a close fitting cylindrical shell member, and places a cylindrical core member through the aperture in the center of the volute, in an effort to confine the flow of the liquid in the shell member and make such flow pass between fins, rather than between the peripheries of the fins and the adjacent surfaces of the shell member and of the core member. However, in actual practice the applicant has found it very difficult to wind double-walled finned tubes into a helix having such close tolerances that it will at the same time fit very snugly against both the shell surface and the surface of the core passing through the aperture in the center of the helical volute.

It is therefore an object of this invention to insert a pair of helically wound wires which respectively lie against the outer surface of the core member and against the inner surface of the shell member, and which wires both have the same pitch as the helical volute member so that the wires are spaced approximately between the convolutions of the volute member, thereby deflecting the flow of liquid which is outside of the volute member away from the cylindrical surfaces of the core member and the shell member and into the fins at the location of each fin of each convolution. This has the effect of completely breaking up any laminar flow which the liquid outside of the volute member may attempt to follow in order to avoid passing through the more turbulent zones between adjacent fins of the volute member.

The fluid outside of the volute tubes is often a more viscose fluid than the liquid within the tubes, this more viscose fluid in the case of the applicant's solar heat exchange circuit comprising silicone oil. This oil is heated in solar exchangers on the roof, and enters the heat exchanger as a hot liquid. It comes in contact right away with tubes carrying colder domestic water, whereupon the viscosity of the silicone oil tends to be increased. This more viscose silicone oil preferentially attempts to slip past the fins of the volute by laminar flow through clearances close to the inner surface of the shell member and close to the outer surface of the core member through the aperture in the center of the volute member. The applicant investigated this problem when he discovered that there was a great variation in heat exchange capabilities from one heat exchanger to another of the same manufacture. He then cut up a number of heat exchangers and discovered that the fins of the volute member rarely lie exactly in contact with both the core member and with the inside surface of the shell member. This is because it is quite difficult to make a heat exchanger to such close tolerances that the fins will exactly fit in the space between the core and shell members, while at the same time making a heat exchanger that can be manually assembled without excessive difficulty. It is therefore an object of this invention to break up such laminar flow using helical wires as described above. Approximately a 35% improvement has been realized in the over-all heat transfer capability by adding the helical wires both inside and outside the volute member.

It is another major object of this invention to provide a method for making a heat exchanger using inner and outer helical wires to break up laminar flow of the fluid outside of the heat exchanger. In order to attach the inner helical wire on the core member before passing it through the preformed volute member, it is necessary to make this helical wire have the same pitch as the volute member so that the core member can be screwed into the preformed volute using the inner helical wire as a thread. However, it is much more difficult to put a helix against the inner surface of the outer shell member and then afterwards install the volute member in this shell.

To begin with, installation of a helical wire on an inner surface of a three inch shell is quite awkward. The present invention therefore teaches a method of initially applying the outer helical wire to the volute member while tacking its ends by soldering to the end convolutions of the volute member and contracting the outer diameter of the helical wire radially inwardly by twisting it to provide it with a smaller diameter nesting between the convolutions of the volute member. Subsequently, after the volute member is inserted in the shell member and the wire is cut at one end, it can relax outwardly by its own spring memory, and bring itself into close contact with the shell member. The outer helical wire may not be precisely centered between convolutions, but it will be centered closely enough so that it will successfully perform its function, namely breaking up laminar flow and causing the outer liquid to circulate between fins, rather than to pass between the peripheries of the fins and the surface of the shell member through whatever clearances may exist at that surface. In this way, the helical wire can be installed along with the volute member within the shell member; one end of the outer helical wire can be cut from the volute member; and the end of the shell member can then be spun downwardly against the outer tube and soldered thereto, all without excessively close tolerances and costly labor. Likewise, the inner helical wire disposed about the core member can be made to lie between the convolutions of the volute and tightly against the outer surface of the core member so as to prevent laminar flow of the liquid between the inside periphery of the volute member formed by the edges of the fins and the outer surface of the core member.

The diameters of the shell member and of the volute member must be kept as small as possible, and any additional exchange surface required must be achieved by elongation of the heat exchanger. A long small diameter shape of the order of 8:1 or greater will tend to cause the viscose fluid within the shell member but outside of the volute member to flow at an elevated rate so as to minimize the forming of non-flowing boundary layers against the surfaces, and especially between the surfaces of adjacent fins.

Other objects and advantages of the invention will become apparent during the following discussion of the drawings which show a preferred embodiment of the invention.

THE DRAWINGS

Figure 4:
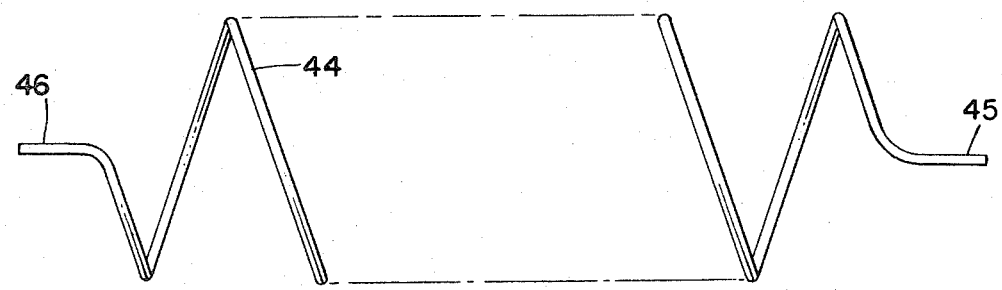
Figure 5:
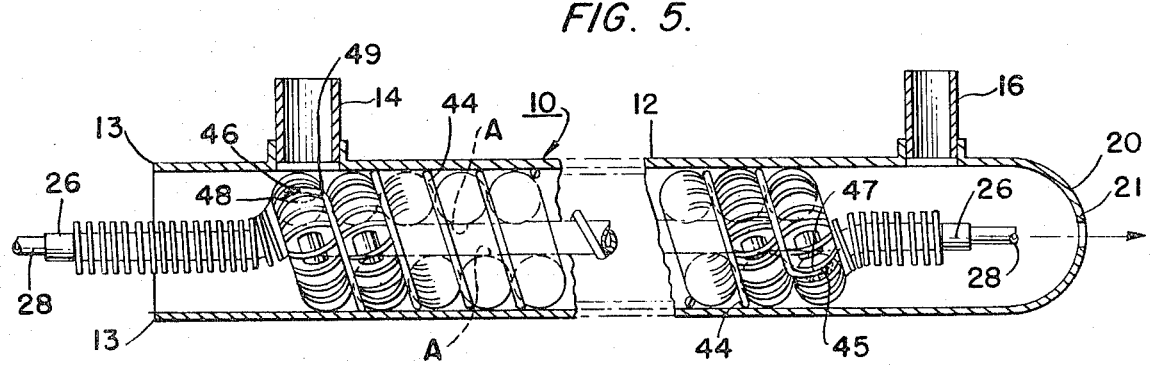

FIG. 4 is a side elevation view of the outer helical wire intended to be disposed against the inner surface of the shell member between the convolutions of the volute member; and FIG. 5 is a side elevation view partly in cross-section showing the volute member, with the core member and the two helical wires attached thereto, being entered into an open end of the shell member during the process of assembling the heat exchanger.

Figure 1:
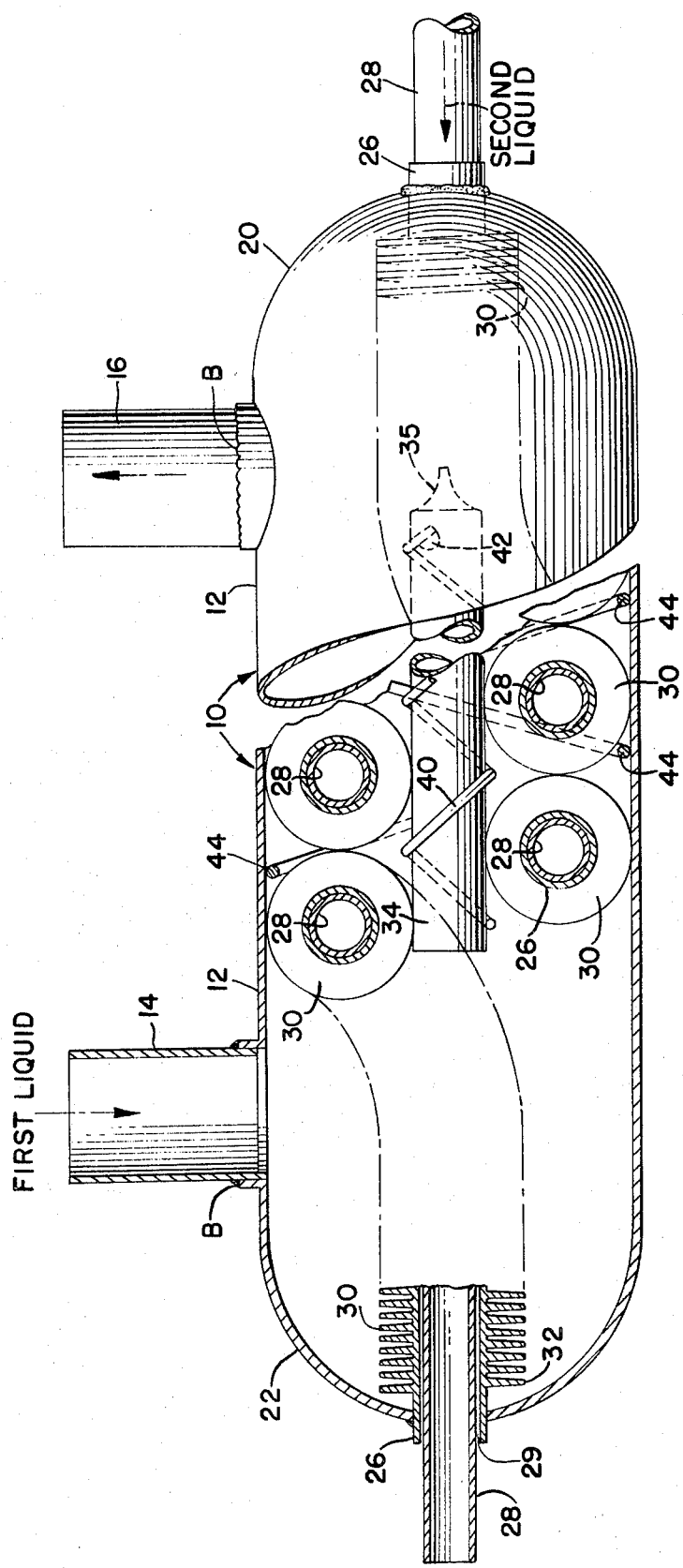
FIG. 1 is a side elevation view of a heat exchanger made according to the invention and shown partly in cross-section.

Referring now to the drawings, FIG. 1 shows an embodiment of a heat exchanger which is illustrative of the present invention and which comprises a heat exchanger shell member 10 having a central portion 12 which extends between an inlet duct 14 and a discharge duct 16, the central portion 12 being cylindrical. The central portion is provided with two hemispherical end portions 20 and 22 which are, in the manufactured form of the heat exchanger, one piece with the central portion 12, the end portions 20 and 22 being spun inwardly while rotating the heat exchanger on a lathe. The inlet duct 14 and the outlet duct 16 are attached, as by soldering or braising B to the upturned edges of several holes in the shell member 10 which are made by inserting a die through a smaller hole and then pulling the edges upwardly, a process which is well known in the fabrication of sheet metal structures.

Figure 3:
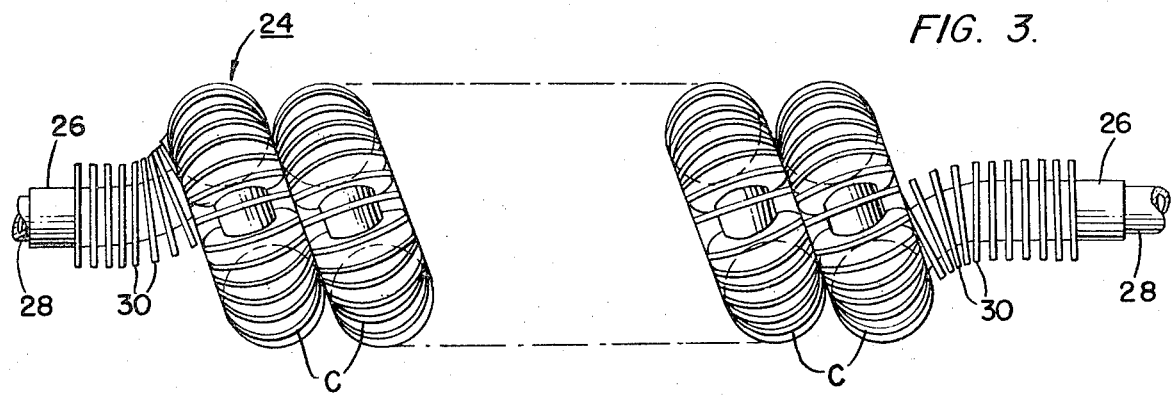
FIG. 3 is a side elevational view showing a helical volute member formed by an outer finned tube and an inner tube fitting therein in snug relationship.

Inside the shell member 10 there is a double-wall volute member 24, FIG. 3, comprising an outer finned tube 26 telescopically receiving an inner tube 28. The outer tube is provided with fins 30 which extend therefrom along most of the length of the outer tube 26, except that the end portions beyond the last fin 32 are free of fins and extend cleanly through the holes 21, FIG. 5, in the centers of the end portions 22 and 20 to a point adjacent to, and just outside of, the shell member. The inner tube 28 is slightly smaller than the outer tube 26 so as to leave a small vent space 29 between the two tubes for the purpose hereinafter discussed.

A core member 34 in the form of a tube extends axially through most of the length of the central portion 12 of the shell member 10. The core tube 34 in the illustrated structure is approximately the same outer diameter as the diameter of the outer tube 26 with the fins removed therefrom, or perhaps somewhat larger to make it easier to wind a finned tube volute that will just fit around the core tube member. The present invention, however, is not limited to a heat exchanger where the core tube member is of small diameter. The double-wall volute member, comprising the tubes 26 and 28 and the fins 30, fits around the core tube member 34 which comprises a sort of mandrel. This volute member provides a number of convolutions C which are located closely adjacent to one another with the fins 30 substantially touching. The convolutions are wound tightly enough to leave a central aperture A defined by the fins which will snugly receive the core tube 34, so that the inner peripheries of the fins rest substantially on the core tube member, FIG. 5. The inside diameter of the shell member in the vicinity of the central portion 12 between the ducts 14 and 16 is selected such that the outer peripheries of the convolutions comprising the outer edges of the fins rests substantially against the inner surface of the central portion 12. This is done in an effort to force the relatively viscose liquid which enters the inlet duct 14 and departs through the outlet duct 16 to travel mostly between the two ducts by passing between fins.

The liquid which passes through the main shell member is referred to in the specification and claims as being the first liquid, and is generally the more viscose of the two liquids, i.e. preferably silicone oil. The core member 34 is pinched together at one end as shown at 35 in FIGS. 1 and 2, and the pinching may be sufficient to actually seal the core member against all flow through it, or else a small path may be allowed to remain in the vicinity of the pinched end 35 so as to permit the liquid flowing through the central portion of the shell member to pass through the core member 34 at a very slow rate, and thereby provide sufficient flow only to keep the liquid within the core member 34 changed and freshened, and to purge air from inside the core member which may become trapped therein at the time that the installation is first placed in service.

The double-wall volute member comprising the tubes 26 and 28 carries the liquid which is referred to in the claims and in the specification as being the second liquid, and the direction of flow of the second liquid through the tube 28 is such that it will be counter to the direction of axial movement of the first liquid through the central portion 12 of the shell member 10. In this way, the warmest liquids are always in contact with each other and the coolest liquids are always in contact with each other, and the temperature differential between these two liquids is made more nearly constant. This concept of counter flow is of course very well known in the heat exchange art and is not claimed as being novel in the present disclosure.

It should be particularly noted that by bringing the ends of the tube 26 outside of the heat exchanger shell member 10 before terminating the ends, any leakage which gets through the finned tube into the vent space 29 between the tubes 26 and 28, or any leakage which passes through the tube 28 into the vent space 29 will always be discharged outside of the heat exchanger. This provides visual indication of leakage to warn the operator of the system if such leakage should occur, and it also insures that any leakage will discharge externally of the heat exchanger and will cause no contamination of either fluid by the other fluid in the heat exchanger. In particular, in a system where fresh water is being used from the city mains, for instance in a domestic hot water system, the first liquid is prevented from contaminating the domestic water if a leak occurs. This is an important safety item where the first liquid comprises oil, antifreeze, or some other non-freezing medium which is connected to flow between the ducts 14 and 16 and within an external solar heat collector panel system.

In actual practice, however, considerable difficulty is experienced in manufacturing a heat exchanger wherein the peripheries of the fins 30 of the volute member 24 precisely touch the inner peripheral surface of the shell member 12 and at the same time precisely touch the outer cylindrical surface of the core member 34. In order to make it possible to push the volute member inside the cylindrical shell member 10 as shown in FIG. 5, it is necessary that some clearance be allowed between the peripheries of the fins 30 and the cylindrical surfaces of the adjacent shell and core members. Moreover, it is not possible to wind a perfect finned volute on a lathe while keeping the fins intact, and this is another reason why it is necessary to allow small clearances between the volute member and the surfaces which confine it internally and externally. Tests showed that there was a considerable difference in heat transfer performance between heat exchangers made at the same time and supposedly having identical designs. It was concluded after considerable study that one of the main reasons for these differences in heat transfer characteristics resides in the fact that some volute members are a better fit against the adjacent surfaces of the shell and core members than are others, whereby some heat exchangers experienced a greater laminar flow of the viscose first liquid through clearances between the peripheries of the fins 30 and the inner and outer surfaces respectively of the shell and core members. Therefore the applicant has added helical wires closely touching the cylindrical surfaces of the shell and core members so as to break up such laminar flow, thereby spoiling its smooth flow characteristic and causing turbulence which deflects the first liquid and forces it to pass between the fins rather than slip past the fins adjacent to the cylindrical surfaces.

Figure 2:
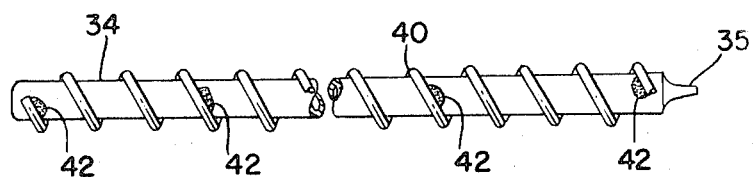
FIG. 2 is a side elevation of a core member showing the inner helical wire wound thereon and fixed thereto.

For this purpose, an inner helical wire 40 is wound around the core member 34 as shown in FIG. 2 and is fixed to it at intervals by soldering as shown at 42 so as to keep the helical wire 40 substantially in place on the core member 34. Since it would not be possible to insert the core member into the preformed volute member 24 with the wire helix 40 in place merely by pushing the core member axially into the volute member as could be done in earlier heat exchangers in which no helical wire was present, the idea was developed that the helical wire 40 should have the same pitch as the helical volute member 24, whereby the core member 34 and helical wire 40 could be screwed into one end of the volute member before insertion of the volute member into the heat exchanger shell 10, FIG. 5.

However, the problem of providing a similar helical wire 44 against the internal surface of the shell member in the vicinity of its cylindrical portion 12 proved to be much more difficult. A method was developed by which another larger diameter wire helix 44 was wound on a lathe so that the helix was slightly larger in diameter than the diameter of the inner surface of the shell member 12. If this helix 44 could be inserted into the shell between the convolutions of the volute member as shown in FIG. 1, the natural springiness of the spring helix 44 would be sufficient to hold it tightly against the inner surface of the shell member. However, this proved to be very difficult to install. The idea was finally developed that the outer helix 44 would be soldered to the fins of the volute at the ends 45 and 46 of the helix 44 using a small quantity of solder as shown at 47 and 48 in FIG. 5. This soldering of the ends is preceded by tightening of the helix by winding it sufficiently so as to make its diameter shrink below the diameter of the cylindrical portion 12 of the shell member, whereby the outer helix 44 can be easily entered into the shell between the convolutions of the volute 24. Once in place so that the helix 44 is entirely within the shell portion 12, it is possible to reach in and clip the helix near one end, thereby allowing it to expand again by spring memory against the inner periphery of the shell portion 12 to thereby tighten its fit on the shell portion 12 and prevent the first liquid from passing between the spring helix 44 and the shell periphery. For instance, in FIG. 5, wirecutters can be inserted through the duct 14 to clip the wire at the location marked 49.

The volute member and helix 44 are therefore fully entered into the shell member, passing the outer tube 26 through the opening 21 where it is soldered to the shell member. When the volute member is fully in place longitudinally within the shell member 12, the other end 22 of the shell 13 is spun over against the other end of the tube 26 to which it is then soldered in order to produce the finished heat exchanger as shown in FIG. 1.

Thereby, a method is provided for manufacturing and installing the various parts of the heat exchanger, including the volute member with the inner helix 40 and the outer helix 44, all of which parts form a tortuous path through which the first liquid located outside of the volute member must flow in order to pass from the inlet duct 14 to the outlet duct 16 of the heat exchanger. A typical heat exchanger manufactured according to the present invention comprises a three inch nominal diameter shell 10, and the shell is approximately three feet long. The relative proportions as to the diameters of the other parts are close to those shown in FIG 1, ⅛ inch diameter (or smaller) springy copper wire being used for the inner and outer helix members 40 and 44, the diameters of the fins being about eight times the diameter of the helix wire.

The present invention is not to be limited to the exact form or proportions shown in the figures, for obviously changes may be made therein within the scope of the claims.

I claim:

1. The method of assembling a heat exchanger having an outer cylindrical shell member, a preformed helical volute member having multiple convolutions with external fins whose outer peripheries fit into the shell member and whose inner peripheries define a central aperture and having end tubes extending from the convolutions axially of the shell member, and a core member shaped to fill the central aperture defined by the inner peripheries of the fins, including the following steps:
    (a) winding a first helix of a wire whose diameter is small as compared with the diameter of a fin snugly around the core member with the same pitch as the volute member and securing the first helix to the core member;
    (b) screwing the wound core member into the central aperture to fill the latter along the length of the convolutions;
    (c) forming a second helix of wire whose diameter is small as compared with the diameter of a fin, the pitch of the second helix being the same as the pitch of the volute member and the outer diameter of the second helix being such as to permit the second helix to lie between the convolutions of the volute member and substantially tangent to a circle equal to the diameter of the inner surface of the shell member;
    (d) interwinding the second wire helix with the volute member;
    (e) inserting the volute member, the core member, and the interwound wire helices into the shell member; and
    (f) closing the ends of the shell member and sealing the end tubes of the volute member to the shell member.

2. The method as claimed in claim 1, wherein the second helix member is formed with an outer diameter slightly larger than the diameter of said inner surface, the additional steps of:
    distorting the interwound second helix to reduce its diameter until it is less than the diameter of said inner surface;
    fixing the ends of the distorted second helix to adjacent fins of the volute;
    subsequently performing said inserting step;
    releasing one end of the second helix to allow it to expand tightly against said inner surface; and
    subsequently performing said closing and sealing steps.

* * * * *